UNITED STATES PATENT OFFICE.

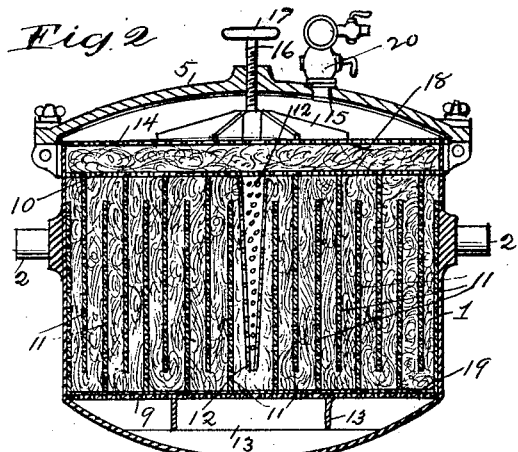
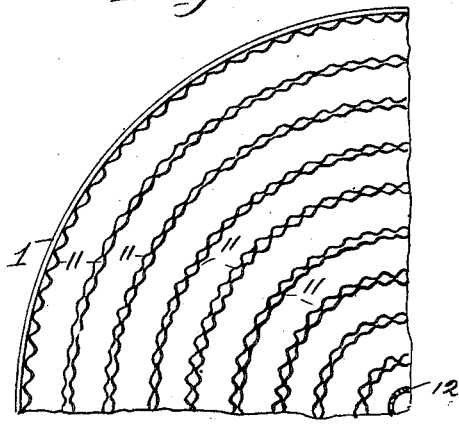
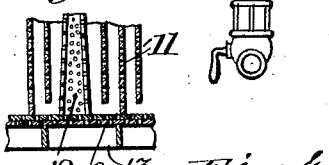
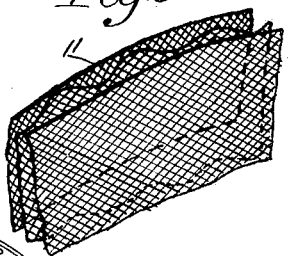
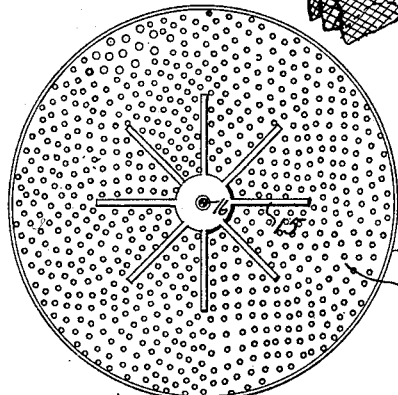
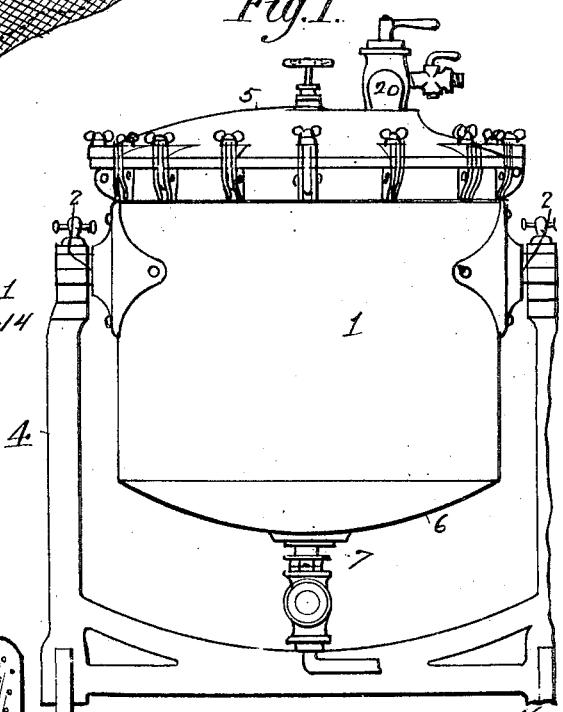

BALDWIN F. SCHIRMER, OF CLEVELAND, OHIO.

FILTER.

No. 813,327.     Specification of Letters Patent.     Patented Feb. 20, 1906.

Application filed March 21, 1904. Serial No. 199,175.

*To all whom it may concern:*

Be it known that I, BALDWIN F. SCHIRMER, a citizen of the United States, and a resident of Cleveland, county of Cuyahoga, State of Ohio, have invented certain new and useful Improvements in Filters, of which I hereby declare the following to be a full, clear, and exact description, such as will enable others skilled in the art to which it appertains to make and use the same.

The objects of the invention are to provide a constant, natural, and continuously downward flow of the fluid undergoing treatment in the filter (largely obtained by gravity) by which means malt fluids and beer or other fluids containing carbonic-acid gas will not become separated or disrupted from the gas, which if permitted will rise to the top of the filter, thus causing the fluid to foam and make the filter inoperative by disturbing and affecting the action of the fluid.

A further object is to increase the effectual filtering area and the area of distribution and discharge, thereby increasing the flow materially without reducing the utility of action of the filter.

A further object is to provide a separate chamber for primary filtration, whereby the coarser refuse and undesirable suspended matter can be collected previously to the introduction of the fluid to the final action of the filter. This chamber is also accessible for cleaning at any time without disturbing the main or more permanent portion of the filter and is also provided with a filter mass of less density than that in the main portion of the filter and therefore more easily cleansed.

I accomplish these objects by means of the vertical casing in which are disposed vertical partitions provided with vertical and lateral passages, the partitions being separated by spaces containing tightly-packed filter mass and arranged alternately, touching the top and bottom perforated plates. A perforated tube admits the fluid to the central space and is inclosed in the filter mass, and the device is completed by means of a sloping bottom or collecting-chamber.

The device further comprises perforated plates separating the first and final filtering-chambers, a perforated plate upon the upper chamber, and a similar plate underneath the lower chamber, a device for compressing the filter mass in the upper chamber, and valves controlling the inlet and outlet passages to the filter.

The invention further consists in the combination and arrangement of the various parts and construction of details, as hereinafter described, shown in the accompanying drawings, and specifically pointed out in the claims.

In the accompanying drawings, Figure 1 is an exterior view of the device. Fig. 2 is a vertical central section thereof. Fig. 3 is a quarter-section, on an enlarged scale, taken horizontally through the lower portion of the filter. Fig. 4 is a plan view of upper chamber with cover removed, and Fig. 5 is a modified form of construction of one of the partitions. Fig. 6 shows the adjacent plates diagonally fluted in different directions, thus preventing the plates from coming into contact over their entire area. Fig. 7 is a small broken section of bottom of filter, showing the central tube resting upon the bottom perforated plate.

In the views, 1 is the filter-casing, which for convenience in handling is mounted upon trunnions 2, pivoted upon bearings upon a movable truck 4. (Shown partly broken away in Fig. 1.) A cover 5 is removably secured upon the casing. The lower portion of the casing is curved or sloped at 6 to permit the fluid to run to the central discharge-opening 7. The filter mass 8 rests upon the perforated plate 9. A similar perforated plate 10 forms the upper wall of the main filter-chamber. The partitions 11 are shorter than the height of the chamber and alternately rest upon the bottom-plate 9 or engage the upper plate 10. All space between the partitions and between the partitions and the plates 9 and 10 are filled with tightly-packed filter mass. The central space is provided with a tube 12, tapered downwardly, if preferred, which engages the upper plate, or if the partitions alternate differently, the lower plate. The lower plate is preferably strengthened by means of ribs 13. The upper chamber 18, employed for initial filtering to remove coarser particles, before entering the main portion of the filter is inclosed between the upper plate 14, which is also perforated, and the perforated plate 10 of the lower chamber. A pressure-plate is shown at 15, which rests upon the upper plate 14 and is operated by a screw 16 and hand-wheel 17, the nut being formed in the cover 5. The upper chamber 18 is accessible for cleaning at any time and is employed as a protection for the lower chamber, since the partitions and tightly-packed filter mass therein are not so accessible for cleansing and if the fluid is partially filtered before entering the lower chamber it will not be necessary to cleanse this portion of the device nearly as often as if the preliminary filter were not employed.

The filter mass in the upper chamber is loosely packed, and any required pressure thereon can be obtained by means of the screw-press. At 20 is seen the inlet-valve.

A light sieve of tinned copper 19 is preferably placed upon the lower perforated plate 9 to prevent the filter mass or its fine fibers from passing through.

The partitions are shown in Fig. 3 to be composed of corrugated plates of tinned copper so placed that the opposing corrugations alternately recede from one another and alternately touch, thus forming vertical passages. The lateral perforations permit free passage of the fluid, and a constant current is thus provided through the filtering material from the discharging-passages to the receiving-passages, and thus through the bottom perforated plate.

The exact construction of the partitions can be varied—as, for instance, they might be formed of corrugated netting and a vertical screen of netting attached thereto on either side, as shown in Fig. 5, or the corrugations can be diagonal, and thus there will be no danger of closing the passages when the plates touch one another, as in Fig. 6. The exact construction of all details could be changed in shape or proportion, and it is possible to arrange the partitions in other figures instead of circular, or other changes obvious to a skilled mechanic could be made without departing from the spirit of the invention.

Furthermore, the filter could be used in a horizontal position, if necessary, as well as in a vertical position, or a complete filter could be constructed from the secondary chamber alone without the use of the primary chamber.

Having described my invention, what I claim as new, and desire to secure by Letters Patent, is—

1. A filter, comprising, in combination, a main filter-chamber, vertical partitions therein provided with longitudinal and lateral openings, a perforated plate forming the top of the chamber, a perforated plate forming the bottom of the chamber, with which top and bottom plates the partitions alternately engage, a primary filtering-chamber mounted upon the main chamber, and communicating therewith through said top perforated plate, a common casing for both chambers, an inlet-passage leading to the primary chamber, an outlet-passage leading from the main chamber and a filter in each chamber, substantially as described.

2. A filter comprising, an external casing, and upper primary and lower secondary filter-chambers therein, perforated plates forming end plates for said chambers, a perforated plate separating said chambers, a pressure device for the primary chamber, vertical partitions in said secondary chamber alternately engaging the perforated plates which inclose said chamber and provided with vertical and lateral passages, a central perforated tube, engaging the upper perforated plate of the lower chamber, loosely-packed filter mass in the primary chamber, and tightly-packed filter mass in the secondary chamber, separating the partitions from each other and from the perforated plates at alternate ends, substantially as described.

3. The combination in a filter, of a casing, a cover therefor, a bottom sloping to an outlet-passage, a perforated plate in said bottom, a tightly-packed filter mass upon said perforated bottom plate, a perforated top plate upon the filter mass, vertical partitions concentrically arranged in said filter mass and alternately engaging said top and bottom plates, the said partitions being laterally perforated, a filter mass upon the said top plate, a perforated plate thereon, and a pressure device for said last-mentioned perforated plate consisting of a pressure-plate resting thereon and a screw passing through the said cover for the casing, substantially as described.

4. The combination with a casing, and perforated top and bottom plates of a filter, of a filter mass tightly compressed between said plates, and vertical concentric partitions, in said mass, provided with vertical and lateral passages, the said partitions alternately engaging the said perforated plates, and alternately separated therefrom, substantially as described.

5. In a filter, the combination with a casing, of a filter-mass chamber therein, perforated plates forming the top and bottom thereof, and partitions therein comprising concentrically-arranged vertical plates, each partition comprising oppositely-corrugated plates in close juxtaposition, the opposing corrugations of said plates alternately touching and alternately forming vertical passages, lateral openings in both of said corrugated plates, and the said partitions so disposed alternately engaging the top and bottom plates, and alternately out of contact therewith, and a filter mass, separating said partitions from one another, and alternately separating said partitions from the top and bottom plates, substantially as described.

6. A filter, comprising in combination, a main filter-chamber, vertical partitions therein, provided with vertical and lateral openings, a perforated plate forming one end of the chamber, a perforated plate forming the other end of the chamber, with which plates the partitions alternately engage, a primary filtering-chamber mounted upon the main chamber and communicating therewith through the separating perforated plate at that end, a common casing for both chambers, an inlet-passage leading to the primary filter-chamber, an outlet-passage leading from the main chamber, filter mass filling each chamber, and a pressure device for the primary filter-chamber, substantially as described.

In testimony whereof I hereunto set my hand this 18th day of March, 1904.

BALDWIN F. SCHIRMER.

Witnesses:
 WM. M. MONROE,
 GEO. S. COLE.